US012381311B2

(12) United States Patent
Hsiao et al.

(10) Patent No.: US 12,381,311 B2
(45) Date of Patent: Aug. 5, 2025

(54) MULTIBAND PRINTED ANTENNA

(71) Applicant: Cheng Uei Precision Industry Co., LTD., New Taipei (TW)

(72) Inventors: Lan-Yung Hsiao, New Taipei (TW); Ping-Chun Lu, New Taipei (TW); Shao-Kai Sun, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 111 days.

(21) Appl. No.: 18/404,882

(22) Filed: Jan. 4, 2024

(65) Prior Publication Data

US 2024/0332787 A1 Oct. 3, 2024

(30) Foreign Application Priority Data

Mar. 30, 2023 (CN) ......................... 202320660804.9

(51) Int. Cl.

| | |
|---|---|
| ***H01Q 5/371*** | (2015.01) |
| ***H01Q 1/24*** | (2006.01) |
| ***H01Q 1/38*** | (2006.01) |
| ***H01Q 1/48*** | (2006.01) |
| ***H01Q 5/25*** | (2015.01) |
| ***H01Q 5/321*** | (2015.01) |

(52) U.S. Cl.
CPC ............... *H01Q 1/38* (2013.01); *H01Q 1/243* (2013.01); *H01Q 1/48* (2013.01); *H01Q 5/25* (2015.01); *H01Q 5/321* (2015.01)

(58) Field of Classification Search
CPC H01Q 1/38; H01Q 1/243; H01Q 1/48; H01Q 5/25; H01Q 5/321; H01Q 9/0421; H01Q 9/42; H01Q 5/371
See application file for complete search history.

(56) References Cited

U.S. PATENT DOCUMENTS

| | | | | |
|---|---|---|---|---|
| 12,183,995 | B2 * | 12/2024 | Cheng ...................... | H01Q 1/24 |
| 2008/0094283 | A1 * | 4/2008 | Mei ........................ | H01Q 9/285 343/700 MS |

* cited by examiner

*Primary Examiner* — David E Lotter
(74) *Attorney, Agent, or Firm* — Cheng-Ju Chiang

(57) ABSTRACT

A multiband printed antenna includes a radiator arranged on an upper portion and one end of a circuit board, and a grounding body. The radiator includes a feed-in part, a first radiation part straightly extended rightward from an upper section of a first right edge of the feed-in part, and a second radiation part sequentially extended rightward, then extended upward, later extended leftward, and further extended downward from a lower section of the first right edge of the feed-in part. The grounding body is arranged on a lower portion of the circuit board. The grounding body is positioned adjacent to a lower portion of a second right edge of the radiator. The grounding body is separated from the radiator.

20 Claims, 5 Drawing Sheets

| Frequency(MHz) | Power(dB) | Efficiency(%) |
|---|---|---|
| 746 | -1.48 | 71.1 |
| 894 | -1.91 | 64.49 |
| 1880 | -0.89 | 81.44 |
| 2170 | -1.42 | 72.04 |
| 2500 | -4.06 | 39.3 |
| 3500 | -1.27 | 74.6 |
| 3800 | -2.93 | 50.97 |
| 5000 | -3.8 | 41.7 |
| 5500 | -2.1 | 61.69 |
| 6000 | -3.7 | 42.68 |

(Data Table)

FIG. 5

MULTIBAND PRINTED ANTENNA

CROSS-REFERENCE TO RELATED APPLICATIONS

The present application is based on, and claims priority from, China Patent Application No. 202320660804.9, filed Mar. 30, 2023, the disclosure of which is hereby incorporated by reference herein in its entirety.

PRIOR ART

With the rapid development of high-tech communication industries, 5G (Fifth Generation) communication technology is gradually popularized, and FR1 frequency band and FR2 frequency band also start to be used. Because partial frequency bands of the 5G communication technology are overlapped with frequency bands of original 4G communication technology, demands for multiband antennas which are used in mobile communication devices.

Currently, electronic devices which are used in the mobile communication devices, antennas are received in shells of the electronic devices, so the antennas are limited to spaces of the shells. The antennas of the electronic devices are generally miniaturized dipole antennas or printed inverted-F antenna (PIFA), etc. Therefore, a miniaturized size of each antenna itself causes that each antenna is operated in multiple frequency bands difficultly.

Therefore, it is necessary to provide a multiband printed antenna, when the multiband printed antenna is in a limited space, the multiband printed antenna is able to be operated in multiple frequency bands.

BACKGROUND OF THE INVENTION

The present invention generally relates to an antenna, and more particularly to a printed antenna which is able to be operated in multiple frequency bands.

SUMMARY OF THE INVENTION

An object of the present invention is to provide a multiband printed antenna disposed on a circuit board which is positioned in an electronic device. The multiband printed antenna is able to be operated in multiple frequency bands. The multiband printed antenna includes a radiator arranged on an upper portion and one end of the circuit board, and a grounding body. The radiator includes a feed-in part, a first radiation part straightly extended rightward from an upper section of a first right edge of the feed-in part, and a second radiation part sequentially extended rightward, then extended upward, later extended leftward, and further extended downward from a lower section of the first right edge of the feed-in part. An extending path of the second radiation part is substantially formed in a P shape. The second radiation part is disposed around an outside of the feed-in part and an outside of the first radiation part. The grounding body is arranged on a lower portion of the circuit board. The grounding body is positioned adjacent to a lower portion of a second right edge of the radiator. The grounding body is separated from the radiator. A first top edge of the grounding body is separated from a lower edge of the radiator by a first vertical distance. A first left edge of the grounding body is separated from the second right edge of the radiator by a first horizontal distance. The grounding body includes a grounding part, a third radiation part extended rightward from a third right edge of the grounding part, and a fourth radiation part sequentially extended rightward, then extended downward and further extended leftward from a top end of a fourth right edge of the third radiation part. The fourth radiation part is formed in a lying U shape.

Another object of the present invention is to provide a multiband printed antenna disposed on a circuit board which is positioned in an electronic device. The multiband printed antenna includes a radiator and a grounding body. The radiator is arranged on an upper portion and one end of the circuit board. The radiator includes a feed-in part, a first radiation part straightly extended rightward from an upper section of a first right edge of the feed-in part, and a second radiation part sequentially extended rightward, then extended upward, later extended leftward, and further extended downward from a lower section of the first right edge of the feed-in part, so the second radiation part is bent for three times, and an extending path of the second radiation part is substantially formed in a P shape, the second radiation part is disposed around an outside of the feed-in part and an outside of the first radiation part. The grounding body is arranged on a lower portion of the circuit board. The grounding body is disposed between the feed-in part and the second radiation part of the radiator. The grounding body is separated from the radiator. A first top edge of the grounding body is separated from a lower edge of the radiator by a first vertical distance. A first left edge of the grounding body is separated from the second right edge of the radiator by a first horizontal distance. The grounding body includes a grounding part, a third radiation part extended rightward from a third right edge of the grounding part, and a fourth radiation part sequentially extended rightward, then extended downward and further extended leftward from a top end of a fourth right edge of the third radiation part, so the fourth radiation part is bent twice, and the fourth radiation part is formed in a lying U shape. A tail edge of the fourth radiation part faces the third radiation part. The grounding part is located between the feed-in part and a tail end of the second radiation part, and the tail end of the second radiation part is adjacent to the grounding part. The first right edge of the feed-in part and the third right edge of the grounding part face towards the same direction, and the first right edge of the feed-in part and the third right edge of the grounding part are parallel with each other.

Another object of the present invention is to provide a multiband printed antenna disposed on a circuit board which is positioned in an electronic device. The multiband printed antenna includes a radiator and a grounding body. The radiator is arranged on an upper portion and one end of the circuit board. The radiator includes a feed-in part, a first radiation part straightly extended rightward from an upper section of a first right edge of the feed-in part, and a second radiation part sequentially extended rightward, then extended upward, later extended leftward, and further extended downward from a lower section of the first right edge of the feed-in part. An extending path of the second radiation part is substantially formed in a P shape. The second radiation part is disposed around an outside of the feed-in part and an outside of the first radiation part. The second radiation part includes a first zone extended rightward from the lower section of the first right edge of the feed-in part, a second zone straightly extended upward from a tail end of the first zone, a third zone straightly extended leftward from a top end of the second zone, and a fourth zone straightly extended downward from a tail end of the third zone. The grounding body is arranged on a lower portion of the circuit board. The grounding body is positioned adjacent to a lower portion of a second right edge of the radiator. The grounding body is separated from the radiator. A first top edge of the grounding body is separated from a lower edge of the radiator by a first vertical distance. A first left edge of the grounding body is separated from the second right edge of the radiator by a first horizontal distance. The grounding body includes a grounding part, a third radiation part extended rightward from a third right edge of the grounding part, and a fourth radiation part sequentially extended rightward, then extended downward and further extended leftward from a top end of a fourth right edge of the third radiation part. The fourth radiation part being formed in a lying U shape. A first bottom edge of the fourth zone is aligned with a second bottom edge of the grounding body.

As described above, the multiband printed antenna feeds electronic signals via a feed-in point, the first radiation part is operated in a frequency band which is ranged from 3600 MHz to 3800 MHZ, the second radiation part is operated in a frequency band which is ranged from 700 MHz to 960 MHz, the third radiation part is operated in a frequency band which is ranged from 4800 MHz to 6000 MHz, the fourth radiation part is operated in a frequency band which is ranged from 1710 MHz to 2700 MHz. Therefore, when the multiband printed antenna is in a limited space, the multiband printed antenna is able to be operated in multiple frequency bands, so that the multiband printed antenna is able to appropriate to a development trend of electronic product miniaturization.

BRIEF DESCRIPTION OF DRAWINGS

The present invention will be apparent to those skilled in the art by reading the following description, with reference to the attached drawings, in which:

FIG. 5 is a data table showing power values and efficiencies of the multiband printed antenna which are corresponding to frequencies of the multiband printed antenna in accordance with the preferred embodiment of the present invention.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
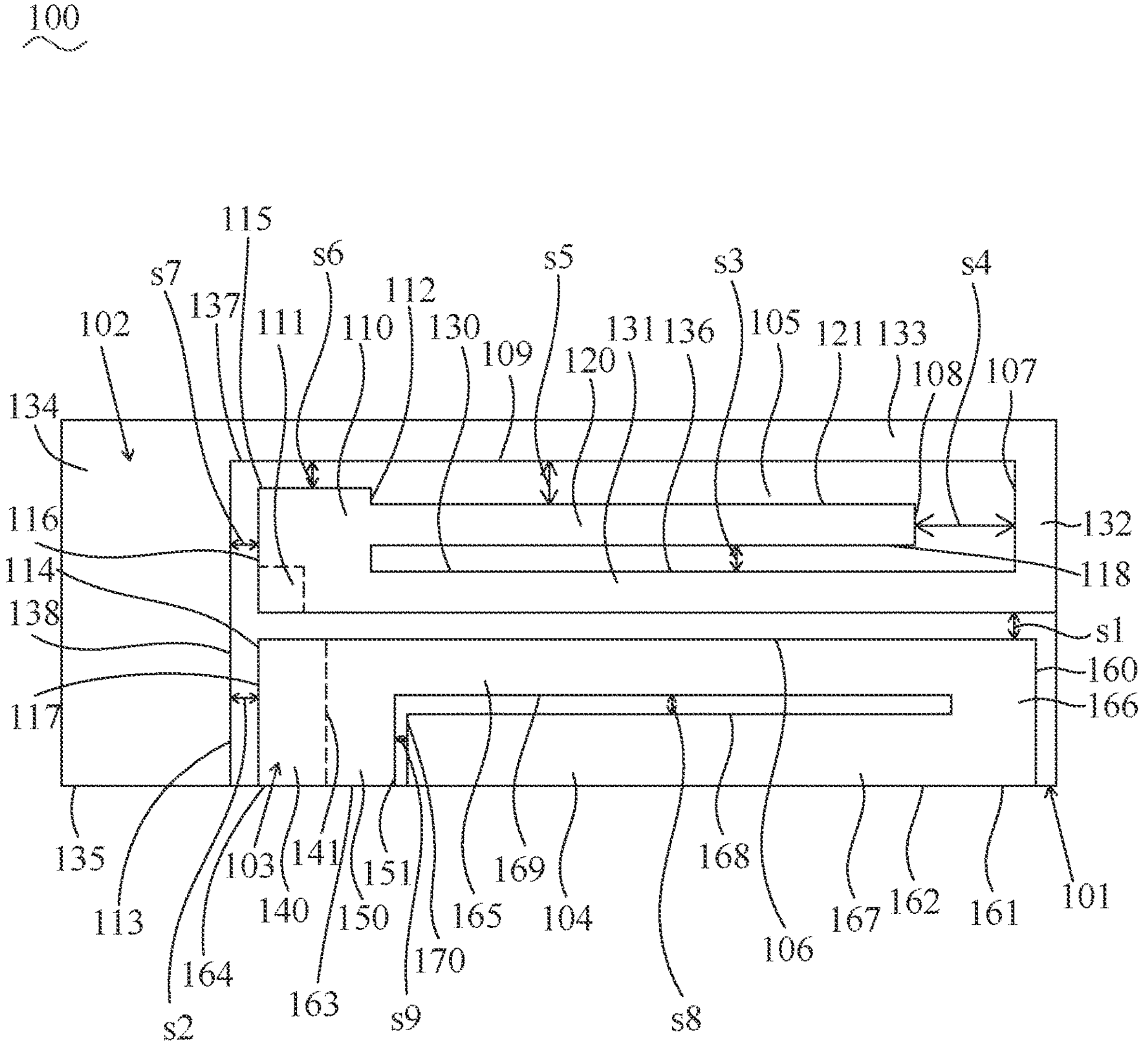
FIG. 1 is a structure diagram of a multiband printed antenna according to a preferred embodiment of the present invention.

Referring to FIG. 1, a multiband printed antenna 100 in accordance with a preferred embodiment of the present invention is shown. The multiband printed antenna 100 is a monopole antenna. The multiband printed antenna 100 is disposed in an electronic device. The multiband printed antenna 100 is disposed on a circuit board 101 which is positioned in the electronic device. The multiband printed antenna 100 includes a radiator 102 and a grounding body 103. The radiator 102 and the grounding body 103 are both arranged on the circuit board 101, and the radiator 102 and the grounding body 103 are separated from each other.

The radiator 102 is arranged on an upper portion and one end of the circuit board 101 of the multiband printed antenna 100. The radiator 102 includes a feed-in part 110, a first radiation part 120 and a second radiation part 130. A feed-in point 111 is arranged at a left end of a lower portion of the feed-in part 110. The first radiation part 120 is straightly extended rightward from an upper section of a first right edge 112 of the feed-in part 110, and the first radiation part 120 is formed in a horizontal strip shape. The second radiation part 130 is sequentially extended rightward, then is extended upward, later is extended leftward, and is further extended downward from a lower section of the first right edge 112 of the feed-in part 110, so the second radiation part 130 is bent for three times, and an extending path of the second radiation part 130 is substantially formed in a P shape. The second radiation part 130 is disposed around an outside of the feed-in part 110 and an outside of the first radiation part 120.

The grounding body 103 is arranged on a lower portion of the circuit board 101 of the multiband printed antenna 100. The grounding body 103 is positioned adjacent to a lower portion of a second right edge 113 of the radiator 102. The grounding body 103 is separated from the radiator 102. The grounding body 103 is disposed between the feed-in part 110 and the second radiation part 130 of the radiator 102. A first top edge 106 of the grounding body 103 faces a lower edge of the radiator 102. The first top edge 106 of the grounding body 103 is separated from the lower edge of the radiator 102 by a first vertical distance s1. A first left edge 114 of the grounding body 103 faces the second right edge 113 of the radiator 102. The first left edge 114 of the grounding body 103 is separated from the second right edge 113 of the radiator 102 by a first horizontal distance s2. The grounding body 103 includes a grounding part 140, a third radiation part 150 and a fourth radiation part 160. The grounding part 140 is located adjacent to the lower portion of the second right edge 113 of the radiator 102. The grounding part 140 is located under the feed-in part 110. The grounding part 140 is located between the feed-in part 110 and a tail end of the second radiation part 130, and the tail end of the second radiation part 130 is adjacent to the grounding part 140. The grounding part 140 is formed in a rectangular shape. The third radiation part 150 is extended rightward from a third right edge 141 of the grounding part 140, and the third radiation part 150 is substantially formed in a rectangular shape. The fourth radiation part 160 is sequentially extended rightward, then is extended downward and is further extended leftward from a top end of a fourth right edge 151 of the third radiation part 150, so the fourth radiation part 160 is bent twice, and the fourth radiation part 160 is formed in a lying U shape. A mouth of the fourth radiation part 160 faces towards a middle of the fourth right edge 151 of the third radiation part 150.

Referring to FIG. 1, in this preferred embodiment, the second radiation part 130 includes a first zone 131, a second zone 132, a third zone 133 and a fourth zone 134. The first zone 131 is extended rightward from the lower section of the first right edge 112 of the feed-in part 110. The second zone 132 is straightly extended upward from a tail end of the first zone 131. The third zone 133 is straightly extended leftward from a top end of the second zone 132. The fourth zone 134 is straightly extended downward from a tail end of the third zone 133. A first bottom edge 135 of the fourth zone 134 is aligned with a second bottom edge 104 of the grounding body 103.

The first radiation part 120 and the feed-in part 110 are arranged in a receiving space 105 surrounded by the first zone 131, the second zone 132, the third zone 133 and the fourth zone 134. A second top edge 136 of the first zone 131 faces a third bottom edge 118 of the first radiation part 120. The second top edge 136 of the first zone 131 is separated from the third bottom edge 118 of the first radiation part 120 by a second vertical distance s3. A second left edge 107 of the second zone 132 faces a fifth right edge 108 of the first radiation part 120. The second left edge 107 of the second zone 132 is separated from the fifth right edge 108 of the first radiation part 120 by a second horizontal distance s4. A fourth bottom edge 109 of the third zone 133 faces a third top edge 121 of the first radiation part 120. The fourth bottom edge 109 of the third zone 133 is separated from the third top edge 121 of the first radiation part 120 by a third vertical distance s5. A fifth bottom edge 137 of the third zone 133 faces a fourth top edge 115 of the feed-in part 110. The fifth bottom edge 137 of the third zone 133 is separated from the fourth top edge 115 of the feed-in part 110 by a fourth vertical distance s6. A sixth right edge 138 of the fourth zone 134 faces a third left edge 116 of the feed-in part 110. The sixth right edge 138 of the fourth zone 134 is separated from the third left edge 116 of the feed-in part 110 by a third horizontal distance s7. The sixth right edge 138 of the fourth zone 134 faces a fourth left edge 117 of the grounding part 140. The sixth right edge 138 of the fourth zone 134 is separated from the fourth left edge 117 of the grounding part 140 by the first horizontal distance s2.

In this preferred embodiment, the fourth radiation part 160 includes a fifth zone 165, a sixth zone 166 and a seventh zone 167. The fifth zone 165 is straightly extended rightward from the top end of the fourth right edge 151 of the third radiation part 150. The sixth zone 166 is straightly extended downward from a tail end of the fifth zone 165. The seventh zone 167 is straightly extended leftward and towards the third radiation part 150 from a tail end of the sixth zone 166. A sixth bottom edge 161 of the sixth zone 166 is aligned with a seventh bottom edge 162 of the seventh zone 167, an eighth bottom edge 163 of the third radiation part 150, a ninth bottom edge 164 of the grounding part 140 and the first bottom edge 135 of the fourth zone 134. A fifth top edge 168 of the seventh zone 167 faces a tenth bottom edge 169 of the fifth zone 165. The fifth top edge 168 of the seventh zone 167 is separated from the tenth bottom edge 169 of the fifth zone 165 by a fifth vertical distance s8. A fifth left edge 170 of the seventh zone 167 faces the fourth right edge 151 of the third radiation part 150. The fifth left edge 170 of the seventh zone 167 is defined as a tail edge of the fourth radiation part 160. The tail edge of the fourth radiation part 160 faces the third radiation part 150. The fifth left edge 170 of the seventh zone 167 is separated from the fourth right edge 151 of the third radiation part 150 by a fourth horizontal distance s9.

When the multiband printed antenna 100 is used for a wireless communication, a current is fed by the feed-in point 111. The current passes through the first radiation part 120, electromagnetic waves in the frequency band which is ranged from 3600 MHz to 3800 MHZ are oscillated, and simultaneously, the current passes through the second radiation part 130, electromagnetic waves in the frequency band which is ranged from 700 MHz to 960 MHz are oscillated.

The first vertical distance s1 and the first horizontal distance s2 arranged between the radiator 102 and the grounding body 103, the second vertical distance s3, the second horizontal distance s4, the third vertical distance s5, the fourth vertical distance s6 and the third horizontal distance s7 arranged in the radiator 102, and the fifth vertical distance s8 and the fourth horizontal distance s9 arranged in the grounding body 103 have certain dimensional requirements and coupling functions. Electric fields and magnetic fields of the feed-in part 110 and the second radiation part 130 are mutually transmitted, and the electric fields and the magnetic fields of the feed-in part 110 and the second radiation part 130 are mutually affected to oscillate electromagnetic waves in a frequency band which is ranged from 1710 MHz to 2700 MHz and a frequency band which is ranged from 4800 MHz to 6000 MHz band.

The third radiation part 150 is coupled with the second radiation part 130 to oscillate the electromagnetic waves in the frequency band which is ranged from 4800 MHZ to 6000 MHZ. The fourth radiation part 160 is coupled with the second radiation part 130 to oscillate the electromagnetic waves in the frequency band which is ranged from 1710 MHz to 2700 MHZ. So, the multiband printed antenna 100 increases the providable frequency bands in a limited space.

Figure 2:
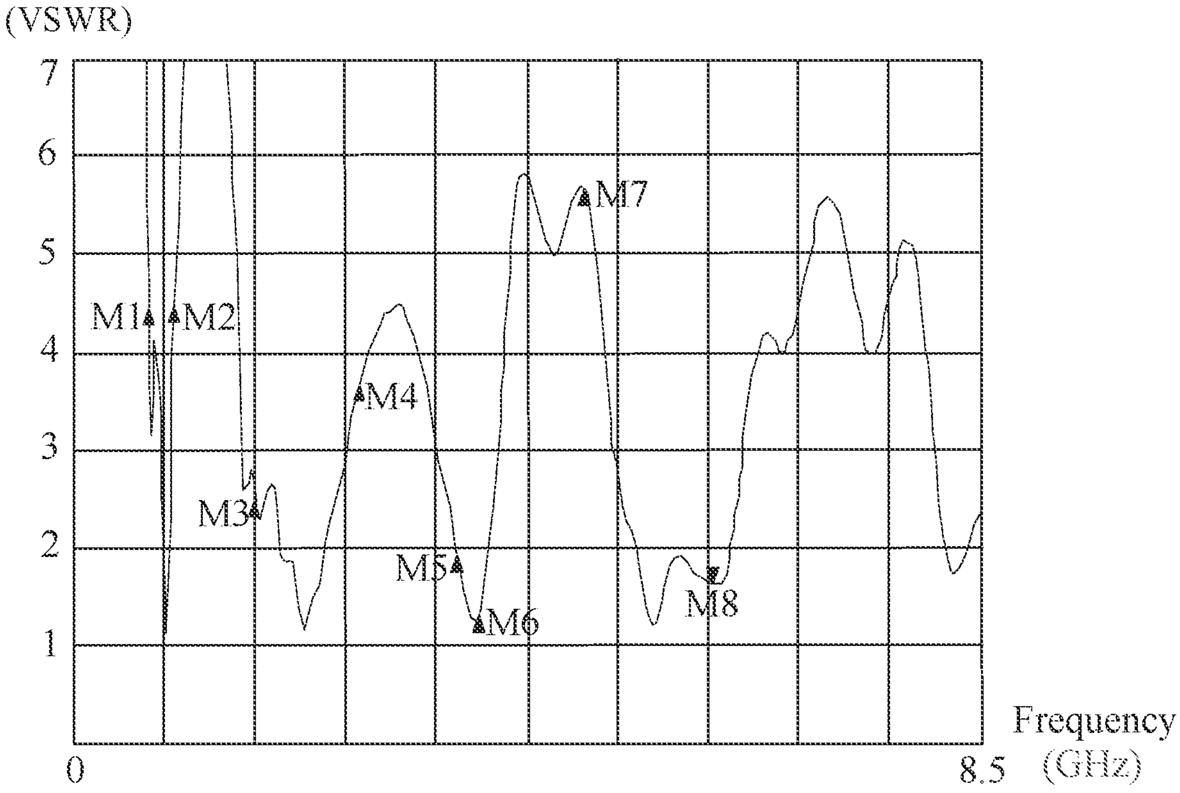
FIG. 2 is a voltage standing wave ratio (VSWR) chart of the multiband printed antenna according to the preferred embodiment of the present invention.

Referring to FIG. 1 and FIG. 2, a voltage standing wave ratio (VSWR) chart of the multiband printed antenna 100 according to the present invention is shown in FIG. 2. When the multiband printed antenna 100 is operated at 700 MHz, a VSWR value of the multiband printed antenna 100 is 4.482 which is shown at a position M1 of FIG. 2. When the multiband printed antenna 100 is operated at 960 MHz, a VSWR value of the multiband printed antenna 100 is 4.5057 which is shown at a position M2 of FIG. 2. When the multiband printed antenna 100 is operated at 1710 MHz, a VSWR value of the multiband printed antenna 100 is 2.5201 which is shown at a position M3 of FIG. 2. When the multiband printed antenna 100 is operated at 2170 MHz, a VSWR value of the multiband printed antenna 100 is 3.673 which is shown at a position M4 of FIG. 2. When the multiband printed antenna 100 is operated at 3600 MHZ, a VSWR value of the multiband printed antenna 100 is 1.9455 which is shown at a position M5 of FIG. 2. When the multiband printed antenna 100 is operated at 3800 MHZ, a VSWR value of the multiband printed antenna 100 is 1.2874 which is shown at a position M6 of FIG. 2. When the multiband printed antenna 100 is operated at 4800 MHZ, a VSWR value of the multiband printed antenna 100 is 5.6588 which is shown at a position M7 of FIG. 2. When the multiband printed antenna 100 is operated at 6000 MHz, a VSWR value of the multiband printed antenna 100 is 1.6314 which is shown at a position M8 of FIG. 2. Therefore, the multiband printed antenna 100 according to the present invention is able to be stably operated in the frequency band which is ranged from 700 MHz to 960 MHz, the frequency band which is ranged from 1710 MHz to 2700 MHZ, the frequency band which is ranged from 3600 MHz to 3800 MHZ and the frequency band which is ranged from 4800 MHZ to 6000 MHZ.

Figure 3:
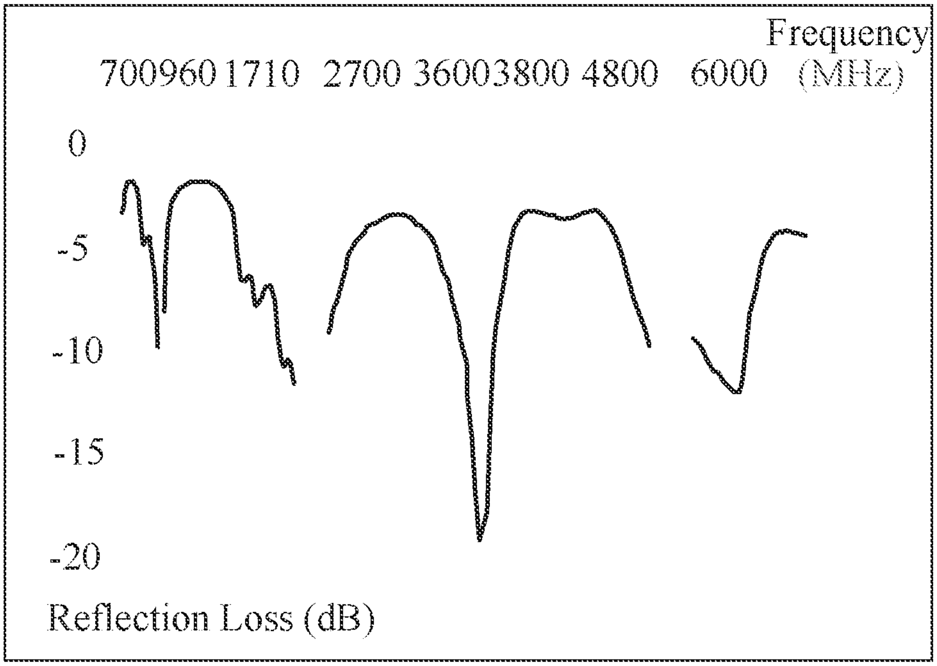
FIG. 3 is a reflection loss diagram of the multiband printed antenna according to the preferred embodiment of the present invention.

Referring to FIG. 1 to FIG. 3, when the multiband printed antenna 100 is operated at lower frequency bands, a return loss of a bandwidth of the multiband printed antenna 100 is roughly within-5 dB, a loss degree of the multiband printed antenna 100 is small, and a radiation energy of the multiband printed antenna 100 is large.

Figure 4:
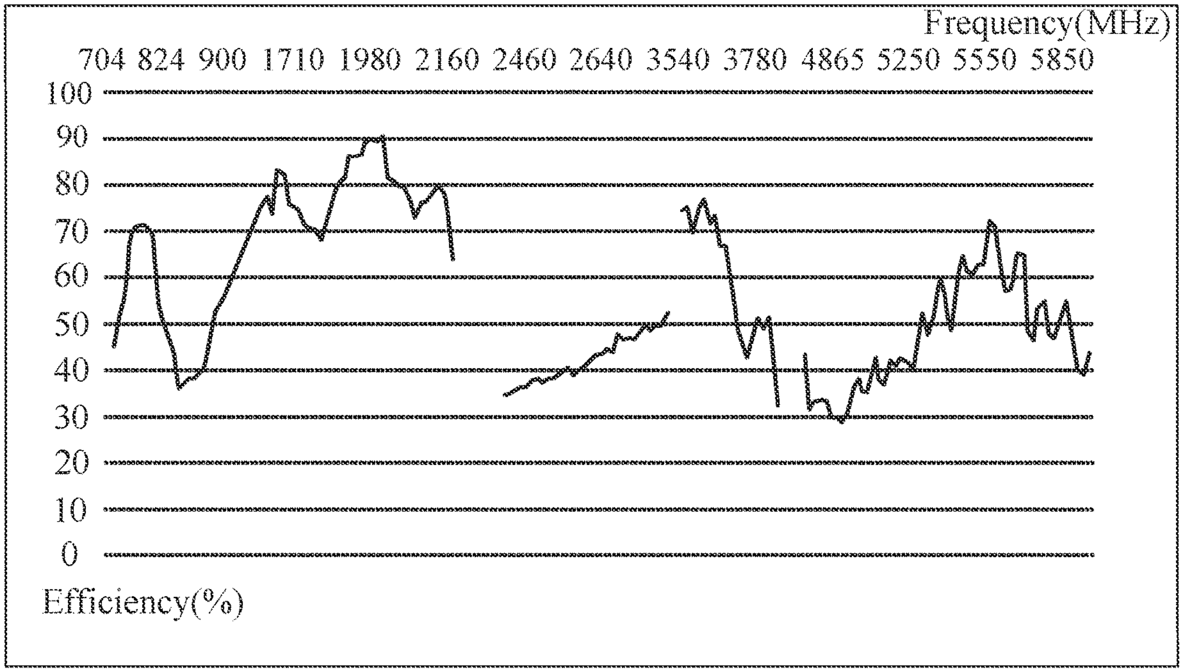
FIG. 4 is an efficiency chart of the multiband printed antenna according to the preferred embodiment of the present invention.

Referring to FIG. 1 to FIG. 5, an efficiency chart of the multiband printed antenna 100 is shown in FIG. 4. A data table showing power values and efficiencies of the multiband printed antenna 100 which are corresponding to frequencies of the multiband printed antenna 100 in accordance with the preferred embodiment of the present invention is shown in FIG. 5. When the multiband printed antenna 100 is operated at different frequencies, the higher an efficiency of the multiband printed antenna 100 which is converted from an average power value is, the better the efficiency of the multiband printed antenna 100 is. In this preferred embodiment, when the multiband printed antenna 100 is operated at the lower frequency bands, the efficiencies of the multiband printed antenna 100 are mostly more than 50%, therefore, when the multiband printed antenna 100 is operated at the lower frequency bands, the multiband printed antenna 100 is able to achieve higher efficiencies in the limited space, and the multiband printed antenna 100 is able to keep certain efficiencies.

As described above, the multiband printed antenna 100 feeds electronic signals via the feed-in point 111, the first radiation part 120 is operated in the frequency band which is ranged from 3600 MHz to 3800 MHZ, the second radiation part 130 is operated in the frequency band which is ranged from 700 MHz to 960 MHz, the third radiation part 150 is operated in the frequency band which is ranged from 4800 MHz to 6000 MHz, the fourth radiation part 160 is operated in the frequency band which is ranged from 1710 MHz to 2700 MHZ. Therefore, when the multiband printed antenna 100 is in the limited space, the multiband printed antenna 100 is able to be operated in multiple frequency bands, so that the multiband printed antenna 100 is able to appropriate to a development trend of electronic product miniaturization.

Though the present invention is disclosed as the above-mentioned preferred embodiment, the preferred embodiment disclosed in this invention is without being intended to limit a scope of this invention. In related technical fields, anyone with ordinary knowledges should be able to make a few changes and embellishments within a spirit and a protection scope of this invention, so the protection scope of this invention should regard defined claims of an attached application patent as a standard.

What is claimed is:

1. A multiband printed antenna disposed on a circuit board which is positioned in an electronic device, the multiband printed antenna comprising:

a radiator arranged on an upper portion and one end of the circuit board, the radiator including a feed-in part, a first radiation part straightly extended rightward from an upper section of a first right edge of the feed-in part, and a second radiation part sequentially extended rightward, then extended upward, later extended leftward, and further extended downward from a lower section of the first right edge of the feed-in part, an extending path of the second radiation part being substantially formed in a P shape, the second radiation part being disposed around an outside of the feed-in part and an outside of the first radiation part; and a grounding body arranged on a lower portion of the circuit board, the grounding body being positioned adjacent to a lower portion of a second right edge of the radiator, the grounding body being separated from the radiator, a first top edge of the grounding body being separated from a lower edge of the radiator by a first vertical distance, a first left edge of the grounding body being separated from the second right edge of the radiator by a first horizontal distance, the grounding body including a grounding part, a third radiation part extended rightward from a third right edge of the grounding part, and a fourth radiation part sequentially extended rightward, then extended downward and further extended leftward from a top end of a fourth right edge of the third radiation part, the fourth radiation part being formed in a lying U shape.

2. The multiband printed antenna as claimed in claim 1, wherein the second radiation part includes a first zone extended rightward from the lower section of the first right edge of the feed-in part, a second zone straightly extended upward from a tail end of the first zone, a third zone straightly extended leftward from a top end of the second zone, and a fourth zone straightly extended downward from a tail end of the third zone, a first bottom edge of the fourth zone is aligned with a second bottom edge of the grounding body.

3. The multiband printed antenna as claimed in claim 2, wherein the first radiation part and the feed-in part are arranged in a receiving space surrounded by the first zone, the second zone, the third zone and the fourth zone.

4. The multiband printed antenna as claimed in claim 2, wherein a second top edge of the first zone is separated from a third bottom edge of the first radiation part by a second vertical distance, a second left edge of the second zone is separated from a fifth right edge of the first radiation part by a second horizontal distance, a fourth bottom edge of the third zone is separated from a third top edge of the first radiation part by a third vertical distance, a fifth bottom edge of the third zone is separated from a fourth top edge of the feed-in part by a fourth vertical distance, a sixth right edge of the fourth zone is separated from a third left edge of the feed-in part by a third horizontal distance.

5. The multiband printed antenna as claimed in claim 4, wherein the sixth right edge of the fourth zone is separated from a fourth left edge of the grounding part by the first horizontal distance.

6. The multiband printed antenna as claimed in claim 5, wherein the fourth radiation part includes a fifth zone straightly extended rightward from the top end of the fourth right edge of the third radiation part, a sixth zone straightly extended downward from a tail end of the fifth zone, and a seventh zone straightly extended leftward and towards the third radiation part from a tail end of the sixth zone, a fifth left edge of the seventh zone is separated from the fourth right edge of the third radiation part by a fourth horizontal distance.

7. The multiband printed antenna as claimed in claim 6, wherein a sixth bottom edge of the sixth zone is aligned with a seventh bottom edge of the seventh zone, an eighth bottom edge of the third radiation part, a ninth bottom edge of the grounding part and the first bottom edge of the fourth zone.

8. The multiband printed antenna as claimed in claim 7, wherein a fifth top edge of the seventh zone is separated from a tenth bottom edge of the fifth zone by a fifth vertical distance.

9. The multiband printed antenna as claimed in claim 1, wherein a feed-in point is arranged at a left end of a lower portion of the feed-in part.

10. The multiband printed antenna as claimed in claim 1, wherein the first radiation part is formed in a horizontal strip shape.

11. The multiband printed antenna as claimed in claim 1, wherein the grounding part is located adjacent to the lower portion of the second right edge of the radiator, the grounding part is located under the feed-in part, the grounding part is formed in a rectangular shape.

12. The multiband printed antenna as claimed in claim 1, wherein the third radiation part is substantially formed in a rectangular shape.

13. The multiband printed antenna as claimed in claim 1, wherein a mouth of the fourth radiation part faces towards a middle of the fourth right edge of the third radiation part.

14. A multiband printed antenna disposed on a circuit board which is positioned in an electronic device, the multiband printed antenna comprising:

a radiator arranged on an upper portion and one end of the circuit board, the radiator including a feed-in part, a first radiation part straightly extended rightward from an upper section of a first right edge of the feed-in part, and a second radiation part sequentially extended rightward, then extended upward, later extended leftward, and further extended downward from a lower section of the first right edge of the feed-in part, so the second radiation part being bent for three times, and an extending path of the second radiation part being substantially formed in a P shape, the second radiation part being disposed around an outside of the feed-in part and an outside of the first radiation part; and a grounding body arranged on a lower portion of the circuit board, the grounding body being disposed between the feed-in part and the second radiation part of the radiator, the grounding body being separated from the radiator, a first top edge of the grounding body being separated from a lower edge of the radiator by a first vertical distance, a first left edge of the grounding body being separated from the second right edge of the radiator by a first horizontal distance, the grounding body including a grounding part, a third radiation part extended rightward from a third right edge of the grounding part, and a fourth radiation part sequentially extended rightward, then extended downward and further extended leftward from a top end of a fourth right edge of the third radiation part, so the fourth radiation part being bent twice, and the fourth radiation part being formed in a lying U shape, a tail edge of the fourth radiation part facing the third radiation part, the grounding part being located between the feed-in part and a tail end of the second radiation part, and the tail end of the second radiation part being adjacent to the grounding part, the first right edge of the feed-in part and the third right edge of the grounding part facing towards the same direction, and the first right edge of the feed-in part and the third right edge of the grounding part being parallel with each other.

15. The multiband printed antenna as claimed in claim 14, wherein the second radiation part includes a first zone extended rightward from the lower section of the first right edge of the feed-in part, a second zone straightly extended upward from a tail end of the first zone, a third zone straightly extended leftward from a top end of the second zone, and a fourth zone straightly extended downward from a tail end of the third zone, a first bottom edge of the fourth zone is aligned with a second bottom edge of the grounding body.

16. The multiband printed antenna as claimed in claim 15, wherein a second top edge of the first zone is separated from a third bottom edge of the first radiation part by a second vertical distance, a second left edge of the second zone is separated from a fifth right edge of the first radiation part by a second horizontal distance, a fourth bottom edge of the third zone is separated from a third top edge of the first radiation part by a third vertical distance, a fifth bottom edge of the third zone is separated from a fourth top edge of the feed-in part by a fourth vertical distance, a sixth right edge of the fourth zone is separated from a third left edge of the feed-in part by a third horizontal distance.

17. The multiband printed antenna as claimed in claim 16, wherein the sixth right edge of the fourth zone is separated from a fourth left edge of the grounding part by the first horizontal distance.

18. The multiband printed antenna as claimed in claim 17, wherein the fourth radiation part includes a fifth zone straightly extended rightward from the top end of the fourth right edge of the third radiation part, a sixth zone straightly extended downward from a tail end of the fifth zone, and a seventh zone straightly extended leftward and towards the third radiation part from a tail end of the sixth zone, a fifth left edge of the seventh zone is separated from the fourth right edge of the third radiation part by a fourth horizontal distance, a sixth bottom edge of the sixth zone is aligned with a seventh bottom edge of the seventh zone, an eighth bottom edge of the third radiation part, a ninth bottom edge of the grounding part and the first bottom edge of the fourth zone.

19. The multiband printed antenna as claimed in claim 18, wherein a fifth top edge of the seventh zone is separated from a tenth bottom edge of the fifth zone by a fifth vertical distance.

20. A multiband printed antenna disposed on a circuit board which is positioned in an electronic device, the multiband printed antenna comprising:

a radiator arranged on an upper portion and one end of the circuit board, the radiator including a feed-in part, a first radiation part straightly extended rightward from an upper section of a first right edge of the feed-in part, and a second radiation part sequentially extended rightward, then extended upward, later extended leftward, and further extended downward from a lower section of the first right edge of the feed-in part, an extending path of the second radiation part being substantially formed in a P shape, the second radiation part being disposed around an outside of the feed-in part and an outside of the first radiation part, the second radiation part including a first zone extended rightward from the lower section of the first right edge of the feed-in part, a second zone straightly extended upward from a tail end of the first zone, a third zone straightly extended leftward from a top end of the second zone, and a fourth zone straightly extended downward from a tail end of the third zone; and a grounding body arranged on a lower portion of the circuit board, the grounding body being positioned adjacent to a lower portion of a second right edge of the radiator, the grounding body being separated from the radiator, a first top edge of the grounding body being separated from a lower edge of the radiator by a first vertical distance, a first left edge of the grounding body being separated from the second right edge of the radiator by a first horizontal distance, the grounding body including a grounding part, a third radiation part extended rightward from a third right edge of the grounding part, and a fourth radiation part sequentially extended rightward, then extended downward and further extended leftward from a top end of a fourth right edge of the third radiation part, the fourth radiation part being formed in a lying U shape;

wherein a first bottom edge of the fourth zone is aligned with a second bottom edge of the grounding body.

* * * * *